United States Patent
Iida

(10) Patent No.: US 6,970,718 B2
(45) Date of Patent: Nov. 29, 2005

(54) SWITCH APPARATUS AND MOBILE COMMUNICATIONS TERMINAL APPARATUS

(75) Inventor: Sachio Iida, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/076,715

(22) Filed: Mar. 10, 2005

(65) Prior Publication Data

US 2005/0159112 A1    Jul. 21, 2005

Related U.S. Application Data

(62) Division of application No. 10/239,940, filed on Sep. 26, 2002.

(30) Foreign Application Priority Data

Feb. 19, 2001   (JP)   ............................ P2001-042003
Feb. 18, 2002   (WO)   ....................... PCT/JP02/01370

(51) Int. Cl.$^7$ ........................... H04M 1/00; H04B 1/44; H04B 1/46
(52) U.S. Cl. ....................... 455/553.1; 455/78; 455/82; 455/83; 455/552.1
(58) Field of Search .............................. 455/78, 82, 83, 455/552.1, 553.1

(56) References Cited

U.S. PATENT DOCUMENTS

| | | | |
|---|---|---|---|
| 6,788,958 B2 * | 9/2004 | Furutani et al. | .......... 455/552.1 |
| 2002/0183016 A1 * | 12/2002 | Kemmochi et al. | ........... 455/83 |
| 2003/0189910 A1 * | 10/2003 | Yamada et al. | ............. 370/335 |

* cited by examiner

*Primary Examiner*—Nick Corsaro
*Assistant Examiner*—Wen Huang
(74) *Attorney, Agent, or Firm*—Jay H. Maioli

(57) ABSTRACT

A small-sized switch apparatus for switching between signal paths of at least first, second and third frequency bands is capable of handling high-powered high-frequency signals with a relatively low control voltage and is useful in a mobile terminal apparatus. A first signal terminal of a diplexer is connected to an antenna terminal, and a second signal terminal is connected to a high-frequency switch via a filter. A third signal terminal of the diplexer is connected to a high-frequency switch via a second filter. The high-frequency switch has PIN diodes as switching devices, and performs switching between a global system for mobile communications transmission signal and a global system for mobile communications reception signal. The high-frequency switch has three sets of serially connected multi-staged FETs as switching devices, and performs switching between wide-band code division multiple access transmission/reception signals, a digital cellular system transmission signal and a digital cellular system reception signal.

1 Claim, 4 Drawing Sheets

F I G. 1
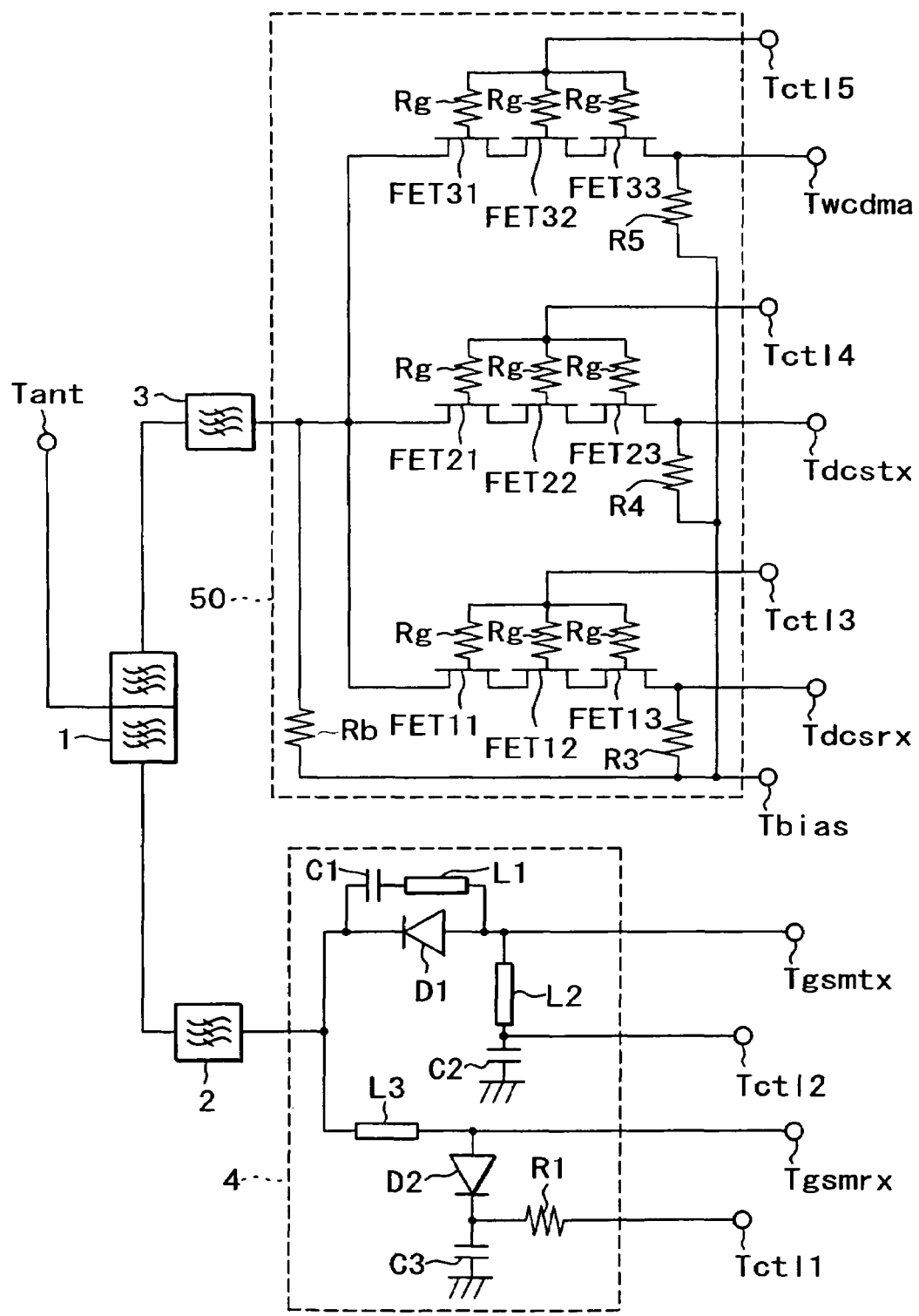

F I G. 2

| | | FET31-33 | Tctl5 | FET21-23 | Tctl4 | FET11-13 | Tctl3 | Tbias | D1 | Tctl2 | D2 | Tctl1 |
|---|---|---|---|---|---|---|---|---|---|---|---|---|
| WCDMA | TRANSMISSION | ON | 3V | OFF | 0 | OFF | 0 | 3V | – | – | – | – |
| | RECEPTION | ON | 3V | OFF | 0 | OFF | 0 | 3V | – | – | – | – |
| DCS | TRANSMISSION | OFF | 0 | ON | 3V | OFF | 0 | 3V | – | – | – | – |
| | RECEPTION | OFF | 0 | OFF | 0 | ON | 3V | 3V | – | – | – | – |
| GSM | TRANSMISSION | – | – | – | – | – | – | – | ON | 3V | ON | 0 |
| | RECEPTION | – | – | – | – | – | – | – | OFF | 0 | OFF | 3V |

SWITCH APPARATUS AND MOBILE COMMUNICATIONS TERMINAL APPARATUS

This is a division of prior application Ser. No. 10/239,940 filed Sep. 26, 2002.

TECHNICAL FIELD

The present invention relates to a mobile communications terminal apparatus, and more specifically, to a switch apparatus for use in a mobile communications terminal apparatus for a multi-system, in which various frequency bands and communications schemes are used, and for switching between signal paths of at least three frequency bands.

BACKGROUND ART

In recent years, mobile communications has developed significantly, and in Europe, mobile communications terminal apparatuses (hereinafter referred to simply as mobile terminals) using several frequency bands and several communications schemes are proposed. For instance, there is UMTS (Universal Mobile Telecommunication System) which combines GSM (Global System for Mobile Communications) using a frequency band of 900 MHz band, DCS (Digital Cellular System) using a frequency band of 1.8 GHz and WCDMA (Wideband Code Division Multiple Access) using a frequency band of 2 GHz.

Because UMTS needs to operate as a mobile terminal of a multi-system with differing frequency bands as well as communications schemes, the circuitry thereof becomes complex, and the increase in the number of components causes the apparatus to become larger and an increase in cost. For this reason, there is a need to reduce the number of components by integrating the circuitry, and to proactively share the components. In particular, since facilitating the sharing of an antenna, which is large in size, greatly contributes to the miniaturization of a terminal, the development of a small-sized switch apparatus is now an important issue in order to switch an antenna between systems.

As a conventional example, there is a switch apparatus for sharing an antenna using a diplexer and a high-frequency switch in a mobile terminal in which GSM and DCS are integrated. Switch apparatuses of this sort include the switch apparatus disclosed in Unexamined Japanese Patent Application No. 2000-183780, for instance.

The configuration of such a switch apparatus of the conventional example is shown in FIG. 4. An antenna, which resonates with the frequency bands of both GSM and DCS, is connected to an antenna terminal $T_{ant}$. A GSM reception circuit is connected to a GSM reception signal terminal $T_{gsmrx}$. A GSM transmission circuit is connected to a GSM transmission signal terminal $T_{gsmtx}$. A DCS reception circuit is connected to a DCS reception signal terminal $T_{dcsrx}$. A DCS transmission circuit is connected to a DCS transmission signal terminal $T_{dcstx}$. A diplexer 1 has the combined characteristics of a high-pass filter and a low-pass filter, and mutually separates signals of GSM and DCS with an isolation of approximately 20 dB. A filter 2 attenuates the higher harmonics of a GSM transmission signal. A high-frequency switch 4 switches between transmission and reception of GSM. A filter 3 attenuates the higher harmonics of a DCS transmission signal. A high-frequency switch 5 switches between transmission and reception of DCS.

Here, PIN diodes are used for the high-frequency switches 4 and 5. The PIN diodes come to be in an on state when forward-biased and the impedance drops to approximately several $\Omega$, and comes to be in an off state of high impedance with an inter-terminal capacitance on the order of several hundred fF. In general, in handling large power with a PIN diode, there is a higher probability of causing distortion in signals during transmission when it is in the off state.

In transmitting with GSM, a voltage of 3V is applied to control terminals $T_{ctl}2$ and $T_{ctl}3$, and 0V is applied to $T_{ctl}1$ and $T_{ctl}4$. As a result, PIN diodes D1 and D2 come to be in the on state, and D3 and D4 come to be in the off state. Thus, it is turned on between the GSM transmission signal terminal $T_{gsmtx}$ and the filter 2, and the GSM transmission signal is transmitted to the antenna terminal $T_{ant}$ via the high-frequency switch 4, the filter 2 and the diplexer 1. Although part of the GSM transmission signal reaches the high-frequency switch 5, because it is attenuated by 20 dB or more from 33 dB of the GSM standards, only approximately 13 dBm is applied to the PIN diodes D3 and D4 both in the off state, and no distortion occurs even with a reverse-bias potential of a low voltage. In transmitting with DCS, a voltage of 3V is applied to the control terminals $T_{ctl}1$ and $T_{ctl}4$, and 0V is applied to the control terminals $T_{ctl}2$ and $T_{ctl}3$, but otherwise an explanation of the operation would be the same as GSM transmission.

Thus, the switch apparatus of the conventional example prevents the occurrence of distortion at the PIN diodes in the off state by mutually separating the transmission signals of GSM and DCS with the diplexer 1. It may be said that this is a configuration realizable with a small-sized diplexer by virtue of the fact that the frequencies are widely separated, GSM being in the 900 MHz band, and DCS in the 1.8 GHz band.

However, in order to make it possible to switch between WCDMA in addition to GSM and DCS, because WCDMA is in the 2 GHz band and DCS is in the 1.8 GHz band, and the frequencies are close to each other, there arises a problem in that these two signals cannot be separated with a small-sized diplexer.

Although a method of suppressing the occurrence of distortion by applying a reverse-bias potential of a high voltage to a PIN diode is also conceivable, it would become necessary to provide a voltage transformer apparatus such as a DC—DC converter, and there arises a problem in that the number of components and the cost increase. Therefore, this method is not suitable for a small-sized mobile terminal.

In addition, high-frequency switches such as the high-frequency switches 4 and 5 which use PIN diodes have a problem in their structure such that they are difficult to expand for use in switching between signals of 3 or more systems.

The present invention is provided in order to solve the this problem, and its object is to provide a small-sized switch apparatus capable of handling high-powered high-frequency signals with a relatively low control voltage, which switches between signals paths of at least a first, second and third frequency bands, and a mobile terminal apparatus using same.

DISCLOSURE OF THE INVENTION

A switch apparatus according to the present invention is a switch apparatus for switching between signal paths of at least a first, second and third frequency bands, and comprises a diplexer having a first signal terminal, which is a transmission/reception signal terminal common to the signals of at least the first, second and third frequency bands mentioned above, a second signal terminal for outputting the signal of the first frequency band separated from a received signal, and a third signal terminal for outputting the remaining signal after the signal of the first frequency band mentioned above is separated, wherein the received signal to be inputted to the first signal terminal mentioned above is divided between the second and third signal terminals mentioned above, and transmission signals inputted to the second and third signal terminals mentioned above are combined and outputted to the first signal terminal, a first high-frequency switch connected to the aforesaid second signal terminal of the diplexer, and a second high-frequency switch connected to the aforesaid third signal terminal of the diplexer, and is characterized in that the first high-frequency switch mentioned above has a plurality of switching means respectively configured with diodes, and is configured such that two signal terminals are selectively switched and connected to the aforesaid second signal terminal of the diplexer, and the second high-frequency switch has at least three switching means respectively configured with FETS, and is configured such that at least three signal terminals are selectively switched and connected to the third signal terminal of the diplexer mentioned above.

As described above, in handling signals of at least three frequency bands, first, a signal of one frequency band and signals of other frequency bands are divided, and the signal in which signals of several frequency bands coexist are handled with at least three switching means in the second high-frequency switch, without increasing the size of the diplexer. The second high-frequency switch comprising at least the three switching means can be made a simple circuit configuration employing a relatively small number of components by being configured with FETs instead of diodes.

In addition, by connecting each of the switching means of the second high-frequency switch in series and in multiple stages, even when a transmission signal of a different frequency band, which does not pass through the diplexer in the second high-frequency switch, is applied without being attenuated, the FETs in the off state are not turned on even with low reverse-bias potentials, and the occurrence of distortion may be prevented.

On the other hand, by having the first high-frequency switch comprise diodes, when switching between the two signal terminals, both diodes are simultaneously turned on at signal transmission. (Both diodes are simultaneously turned off at signal reception.) Thus, the problem of distortion during the off state of the switching devices does not arise at signal transmission in the first high-frequency switch. As regards the relation with the second high-frequency switch, because the diplexer comes in between, the problem of distortion, again, does not arise.

In the switch apparatus above, the signals of the first, second and third frequency bands, for example, are GSM, WCDMA and DCS signals, respectively.

The mobile communications terminal apparatus according to the present invention may be configured by connecting the first signal terminal of the diplexer of the switch apparatus having the configuration mentioned above to the antenna, connecting the transmission/reception circuit for the signal of the first frequency band mentioned above to the two signal terminals of the first high-frequency switch mentioned above, and connecting the transmission/reception circuit for the signals of the second and third frequency bands mentioned above to at least the three signal terminals of the second high-frequency switch mentioned above.

BRIEF DESCRIPTION OF THE DRAWINGS

FIG. 1 is a block diagram showing the configuration of a switch apparatus which is one mode for carrying out the present invention;

FIG. 2 is a diagram which illustrates as a table the status of the control signal of each switching device of the switch apparatus of FIG. 1 and the corresponding switching status;

BEST MODES FOR CARRYING OUT THE PRESENT INVENTION

Modes for carrying out the present invention will now be described in detail below.

Figure 4:
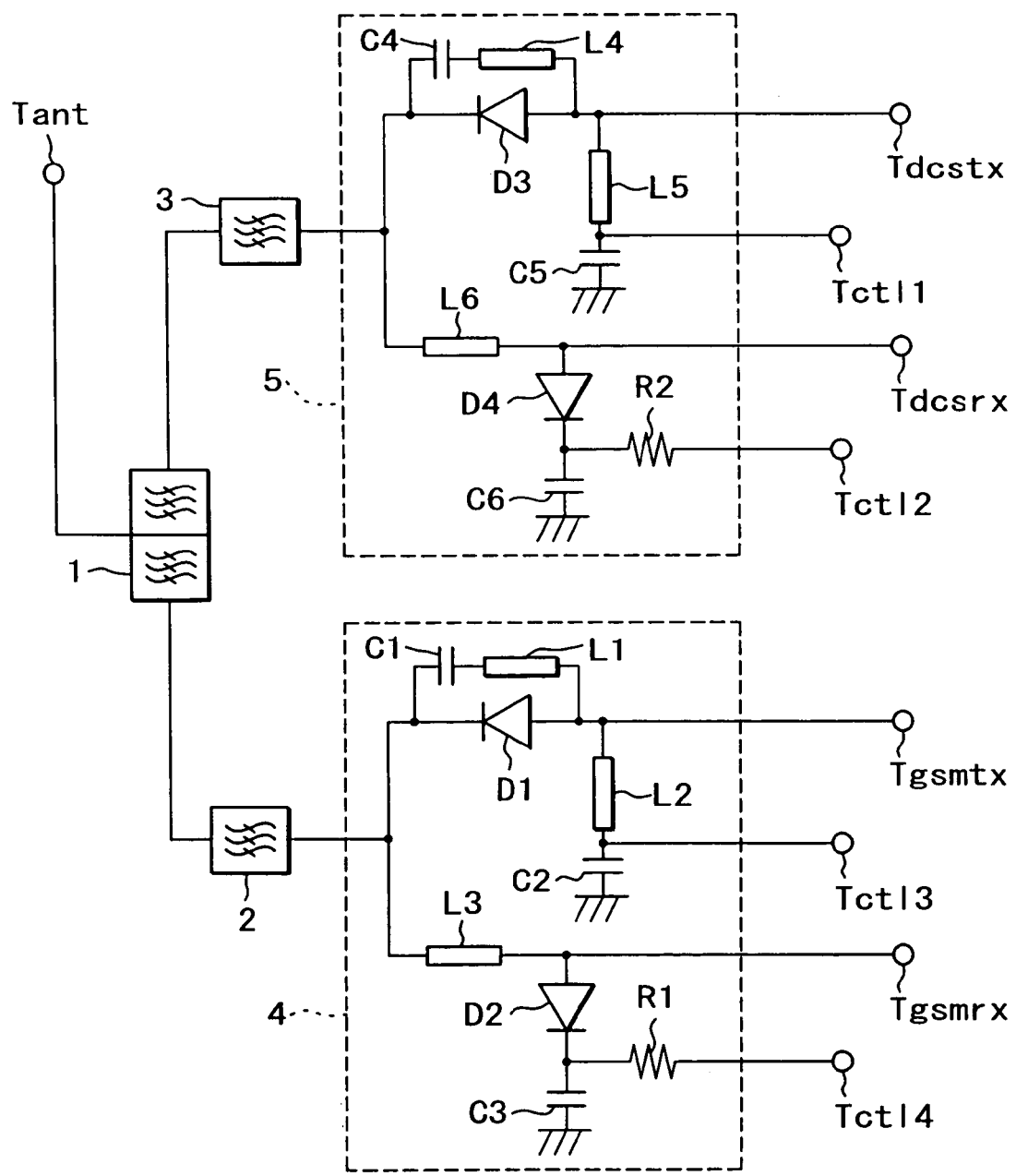
FIG. 4 is a block diagram showing the configuration of a switch apparatus of a conventional example.

FIG. 1 shows the configuration of a switch apparatus of one mode for carrying out the present invention. In this drawing, like elements shown in FIG. 4 are designated by like reference numerals. An antenna, which resonates with the frequency bands of WCDMA, DCS and GSM, is connected to an antenna terminal $T_{ant}$. A GSM reception circuit is connected to a GSM reception signal terminal $T_{gsmrx}$. A GSM transmission circuit is connected to a GSM transmission signal terminal $T_{gsmtx}$. A DCS reception circuit is connected to a DCS reception signal terminal $T_{dcsrx}$. A DCS transmission circuit is connected to a DCS transmission signal terminal $T_{dcstx}$. A WCDMA transmission/reception circuit is connected to a WCDMA transmission/reception signal terminal $T_{wcdma}$. The reason only WCDMA is transmission/reception is because transmission and reception are simultaneously performed since the duplex operation scheme of WCDMA is FDD (Frequency Domain Duplex).

As described above, a diplexer 1 has the combined characteristics of a high-pass filter and a low-pass filter. In the configuration of FIG. 1, the diplexer 1 has a first signal terminal which is connected to the antenna terminal $T_{ant}$, a second signal terminal which is connected to a filter 2 and a third signal terminal connected to a filter 3. WCDMA and DCS signals pass through the high-pass filter of the diplexer 1, GSM signals pass through the low-pass filter of the diplexer 1, both signals are mutually separated with an isolation of approximately 20 dB. The filter 2 attenuates the higher harmonics of the GSM transmission signal. The filter 3 attenuates the higher harmonics of the WCDMA and DCS transmission signals. A high-frequency switch 4 is controlled such that it conducts one of the GSM transmission signal and a reception signal. A high-frequency switch 50 is controlled such that it conducts one of the DCS transmission signal, reception signal and the WCDMA transmission/reception signal.

The high-frequency switch 4 as used herein has the same configuration as the high-frequency switch 4 shown in FIG. 4 and uses PIN diodes as switching devices. As described above, when the PIN diodes are forward-biased, the impedance falls to approximately several Ω and they come to be in an on state, and when reverse-biased, they come to be in an off state of a high impedance with an inter-terminal capacitance on the order of several hundred fF.

On the other hand, for the high-frequency switch 5, field effect transistor FETs, more specifically in this case, GaAs (gallium arsenide) FETs, are used as the switching devices. In other words, serially connected FETs 31, 32 and 33, serially connected FETs 21, 22 and 23 and serially connected FETs 11, 12 and 13 are respectively inserted between the filter 3 and each of the signal terminals the WCDMA transmission/reception signal terminal $T_{wcdma}$, the DCS transmission signal terminal $T_{dcstx}$ and the DCS reception signal terminal $T_{dcsrx}$. A control voltage is applied from a control terminal $T_{ctl}5$ to each of the FETs 31, 32 and 33 via resistances Rg. A control voltage is applied from a control terminal $T_{ctl}4$ to each of the FETs 21, 22 and 23 via resistances Rg. Similarly, a control voltage is applied from a control terminal $T_{ctl}3$ to each of the FETs 11, 12 and 13 via resistances Rg. In addition, a bias voltage terminal $T_{bias}$ is connected to each of the terminals (source or drain) of the FETs 33, 23 and 13 on their transmission/reception circuit sides via resistances R5, R4 and R3. Further, the bias voltage terminal $T_{bias}$ is connected to terminals (drain or source) of the FETs 31, 21 and 11 on the filter 3 side via a resistance Rb.

An FET in a non-saturation region behaves like a resistance, and the fact that the resistance value thereof changes with a gate voltage is made use of. Near a turn-on voltage Vf, the impedance falls to approximately several Ω and it comes to be in the on state, and at or below a pinch-off voltage Vp, it comes to be in the off state of a high impedance with a capacitance of several hundred fF. Although occurrences of distortion are likely even in handling large power with the FET when it is in the off state, by multi-staging and connecting several FETs in series as shown in drawing, it is possible to expand the handling power in proportion to the square of the number of stages.

Incidentally, in the case of PIN diodes, when connected in multiple stages, a reverse bias potential is divided, and the handling power thus cannot be increaesd. The difference between a diode and an FET mainly lies in the fact that FETs are three-terminal devices, where as diodes are two-terminal devices, and that a gate voltage for on/off control is applied to FETs. By connecting FETs in multiple stages, because the input signal voltage can be divided between several FETs, while on the other hand the same gate voltage as that in the case of using a single FET can be maintained for each of the FETs, it becomes possible to increase the handling power without having the reverse-bias potential voltage divided. Thus, FETs are advantageous in that they can easily be multi-staged such that the handling power may be increased.

Incidentally, although the high-frequency switch 4 may have an FET configuration like the high-frequency switch 50, because a control voltage of 5V would currently be required to handle GSM signals (more high-powered than others) with an FET configuration like the high-frequency switch 50, in the present mode, a diode configuration, which can handle GSM signals with a control voltage of 3V, is adopted. In addition, diodes D1 and D2 in the high-frequency switch 4 are turned on at the time of transmission of the GSM signal, as described later, and hence, the problem of distortion occurring does not arise during signal transmission.

In FIG. 2, the status of a control signal of each of the switching devices of the switch apparatus of FIG. 1 and the corresponding switching status are illustrated altogether as a table. As can be understood from this table, when transmitting with GSM on the high-frequency switch 4 side, a voltage of 3V is applied to the control terminal $T_{ctl}2$, and 0V is applied to $T_{ctl}1$. As a result, both of the PIN diodes D1 and D2 come to be in the on state. Therefore, it is now turned on between the GSM transmission signal terminal $T_{gsmtx}$ and the filter 2, and the GSM transmission signal is transmitted to the antenna terminal $T_{ant}$ via the high-frequency switch 4, the filter 2 and the diplexer 1. Incidentally, on the high-frequency switch 50 side, when no transmission is performed, by applying a voltage of 3V to the control terminal $T_{bias}$ and by applying 0V to $T_{ctl}3$, $T_{ctl}4$ and $T_{ctl}5$, all of the FETs may be turned off. At this point, although part of the GSM transmission signal reaches the high-frequency switch 50, because it is attenuated to approximately 13 dBm at the diplexer 1, the FETs in the off state do not give rise to distortion.

When transmitting with DCS on the high-frequency switch 50 side, a voltage of 3V is applied to the control terminals $T_{bias}$, $T_{ctl}1$ and $T_{ctl}4$, and 0V is applied to $T_{ctl}2$, $T_{ctl}3$ and $T_{ctl}5$. As a result, the FETs 21, 22 and 23 come to be in the on state, and the other FETs come to be in the off state. When GSM transmission is not performed simultaneously with DCS, the PIN diodes D1 and D2 also come to be in the off state. At this point, it is turned on between the DCS transmission signal terminal $T_{dcstx}$ and the filter 3, and the DCS transmission signal is transmitted to the antenna terminal $T_{ant}$ via the high-frequency switch 50, the filter 3 and the diplexer 1. Since the maximum transmission power of DCS is assumed to be 30 dBm, this signal may be applied to the other FETs 11, 12 and 13, as well as the FETs 31, 32 and 33 in the high-frequency switch 5 without being attenuated. Therefore, although occurrences of distortion at the switching devices may be anticipated, because the handled power is expanded by multi-staging the FETs in the present mode as mentioned above, it is possible to suppress the occurrences of distortion. Incidentally, although part of the DCS transmission signal reaches the high-frequency switch 4, because it is attenuated by 20 dB or more at the diplexer 1, only approximately 10 dBm is applied to the PIN diodes D1 and D2 even when these diodes are in the off state, and no distortion occurs even with reverse-bias potentials of a low voltage (3V or less in the present mode).

When transmitting with WCDMA on the high-frequency switch 50 side, a voltage of 3V is applied to the control terminals $T_{bias}$, $T_{ctl}1$ and $T_{ctl}5$, and 0V is applied to the control terminals $T_{ctl}2$, $T_{ctl}3$ and $T_{ctl}4$. As a result, the FETs 31, 32 and 33 come to be in the on state, and the other FETs come to be in the off state. If GSM is not operated at the same time, the PIN diodes D1 and D2 also come to be in the off state. Thus, it is turned on between the WCDMA transmission/reception signal terminal $T_{wcdma}$ and the filter 3, and the WCDMA transmission signal is transmitted to the antenna terminal $T_{ant}$ via the high-frequency switch 50, the filter 3 and the diplexer 1. In this case, although occurrences of distortion at the FETs 11, 12 and 13, and the FETs 21, 22 and 23 may be anticipated because the maximum transmission power of WCDMA is assumed to be 24 dBm, it is possible to suppress the occurrence of distortion because, as in the case mentioned above, the handling power is expanded by multi-staging the FETs. In addition, although part of the WCDMA transmission signal reaches the high-frequency switch 4, because it is attenuated at the diplexer 1 by 20 dB or more, only approximately 4 dBm is applied to the PIN diodes D1 and D2 in the off state, and no distortion occurs even with reverse bias potentials of a low voltage.

When receiving with GSM on the high-frequency switch 4 side, a voltage of 3V is applied to the control terminal $T_{ctl}1$, and 0V is applied to $T_{ctl}$. As a result, the PIN diodes D1 and D2 come to be in the off state. Thus, it is turned on between the GSM reception signal terminal $T_{gsmrx}$ and the filter 2, and the GSM reception signal, which entered from the antenna terminal $T_{ant}$, is transmitted to the GSM reception signal terminal $T_{gsmrx}$ via the diplexer 1, the filter 2 and the high-frequency switch 4.

When receiving with DCS on the high-frequency switch 50 side, a voltage of 3V is applied to the control terminals $T_{bias}$ and $T_{ctl}3$, and 0V is applied to the control terminals $T_{ctl}4$ and $T_{ctl}5$. As a result, the FETs 11, 12 and 23 come to be in the on state. Thus, it is turned on between the DCS reception signal terminal $T_{dcsrx}$ and the filter 3, and the DCS reception signal, which entered from the antenna terminal $T_{ant}$, is transmitted to the DCS reception signal terminal $T_{dcsrx}$ via the diplexer 1, the filter 3 and the high-frequency switch 50.

When receiving with WCDMA on the high-frequency switch 50 side, a voltage of 3V is applied to the control terminals $T_{bias}$ and $T_{ctl}5$, and 0V is applied to the control terminals $T_{ctl}3$ and $T_{ctl}4$. As a result the FETs 31, 32 and 33 come to be in the on state. Thus, it is turned on between the WCDMA transmission/reception signal terminal $T_{wcdma}$ and the filter 3, and the WCDMA reception signal, which entered from the antenna terminal $T_{ant}$, is transmitted to the WCDMA transmission/reception signal terminal $T_{wcdma}$ via the diplexer 1, the filter 3 and the high-frequency switch 50.

By a relatively simple circuit configuration of a switch apparatus as described above, a small-sized switch apparatus, which performs switching between signals of three or more systems, and which is capable of handling high-powered high-frequency signals with a relatively low control voltage, may be realized. In addition, since an antenna may be shared among three or more different communications schemes such as GSM, DCS and WCDMA, it becomes possible to configure a small-sized mobile terminal apparatus. Further, in each of the communications schemes GSM, DCS and WCDMA, since the PIN diodes D1 and D2 are in the off state during reception, a reduction in electric current consumption may be realized.

Figure 3:
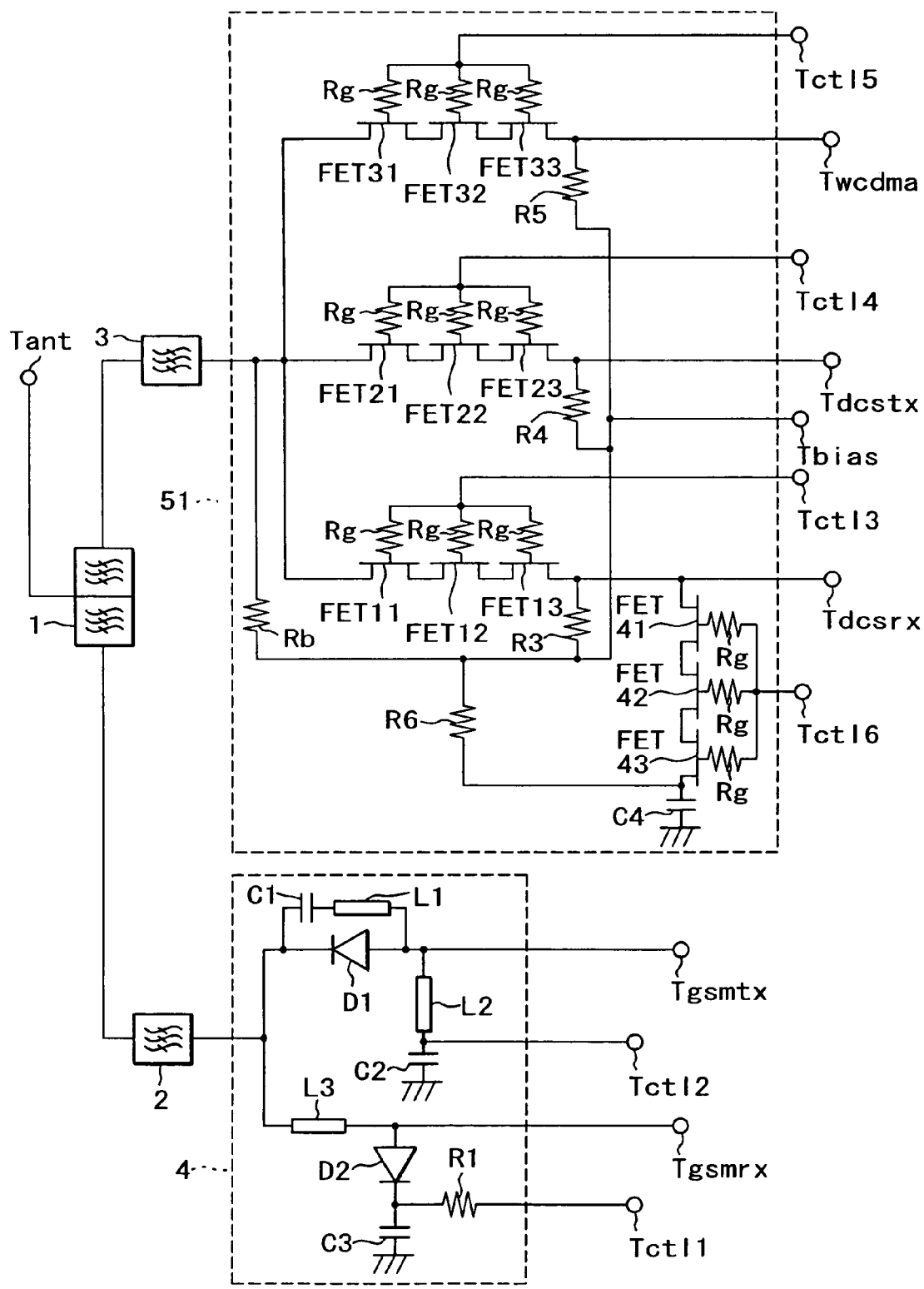
FIG. 3 is a block diagram showing the configuration of a switch apparatus of a second mode for carrying out the present invention.

FIG. 3 shows another mode for carrying out the present invention. This is the switch apparatus shown in FIG. 1, wherein the high-frequency switch 50 is replaced with a high-frequency switch 51. The high-frequency switch 51 is the high-frequency switch 50 to which serially connected FET 41 through FET 43 are added between the $T_{dcsrx}$ signal terminal and the ground as short circuit means. One end of the serially connected FET 41 through FET 43 is connected to the $T_{dcsrx}$ signal terminal, and the other end is connected to a connection point between the resistances Rb and R3 via a resistance R6, while being grounded via a capacitor C4. Isolation may be improved by applying 3V to the gates of the FET 41 through FET 43 via the resistances Rg only during DCS transmission, while applying 0V to the others.

Preferred modes for carrying out the present invention are described above, however, various modifications and changes other than those mentioned above are possible. For example, the control voltages of 0V and 3V applied to the respective control terminals are not necessarily limited to these values. Further, the number of stages of the serially connected FETs is not limited to three stages, and the method of connecting the FETs is not limited to those illustrated in drawing.

According to the present invention, a small-sized switch apparatus, which is capable of handling high-powered high-frequency signals with a relatively low control voltage, and which switches between signal paths of at least a first, second and third frequency bands, may be realized with a relatively simple circuit configuration without increasing the size of a diplexer. In addition, since the antenna may be shared among three or more different communications schemes such as GSM, DCS and WCDMA, it becomes possible to configure a small-sized mobile terminal apparatus. Further, it is possible to simultaneously operate both of the sides (for instance, GSM and WCDMA or DCS and GSM) divided by the diplexer, and hence, a variety of system operations may be accommodated.

What is claimed is:

1. A mobile communications terminal apparatus, comprising:
   a switch apparatus for switching between signal paths and including:
   a diplexer having a first signal terminal forming a transmission/reception signal terminal shared by signals of at least said first, second and third frequency bands, a second signal terminal for outputting a signal of said first frequency band separated from a received signal, a third signal terminal for outputting a remaining signal after said signal if said first frequency band is separated, wherein said received signal inputted to said first signal terminals, is divided between said second and third signal terminals, and transmission signals to be inputted to said second and third signal terminals are combined and outputted to said first signal terminal;
   a first high-frequency switch connected to said second signal terminal of said diplexer; and
   a second high-frequency switch connected to said third signal terminal of said diplexer, wherein
   said first high-frequency switch includes a plurality of switching means respectively configured with diodes for selectively switching between two signal terminals for connection to said second signal terminal of said diplexer, and
   said second high-frequency switch includes at least three switching means respectively configured with FETs selectively switching between at least three signal terminals for connection to said third signal terminal of said diplexer, wherein
   said first signal terminal of said diplexer of the switch apparatus is connected to an antenna;
   a transmission/reception circuit for said signal of said first frequency band is connected to said two signal terminals of said first high-frequency switch;
   a transmission/reception circuit for said signal of said second and third frequency band is connected to said at least three signal terminals of said second high-frequency switch; and
   short circuit means having serially connected FETs connected between one of said three signal terminals and electrical ground and having a terminal for receiving a control signal for controlling said serially connected FETs to connect said one of said three signal terminals to electrical ground.

\* \* \* \* \*